April 10, 1928.
W. A. BRUBAKER
1,665,440
VULCANIZATION
Filed Feb. 28, 1927
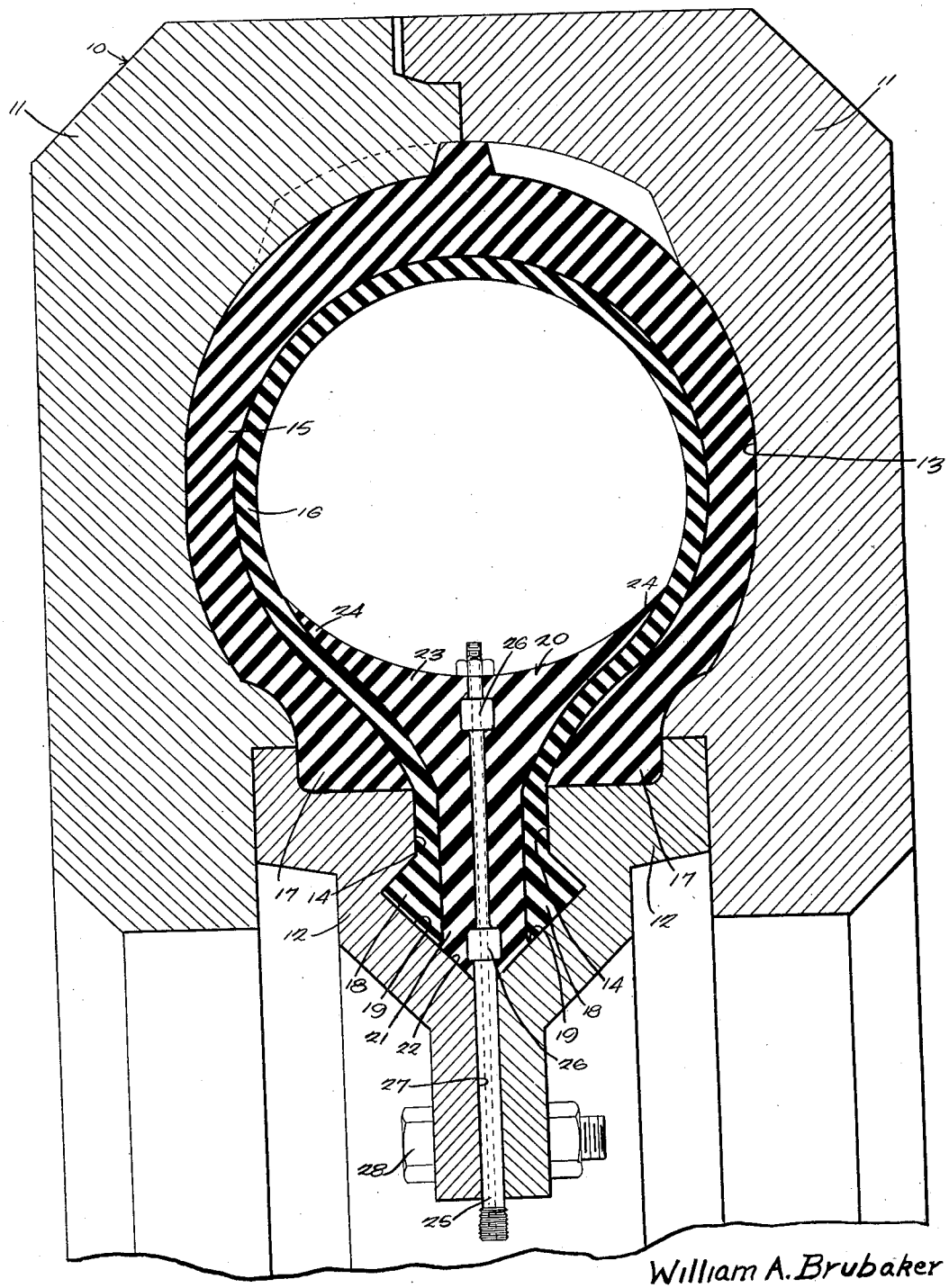
William A. Brubaker
Inventor
by Smith and Freeman
Attorneys Patented Apr. 10, 1928.

1,665,440

UNITED STATES PATENT OFFICE.

WILLIAM A. BRUBAKER, OF AKRON, OHIO.

VULCANIZATION.

Application filed February 28, 1927. Serial No. 171,440.

My invention relates to vulcanization, and particularly to vulcanizing automobile tires under internal fluid pressure, and the principal object of my invention is to provide a new and improved apparatus for the vulcanizing of automobile tires in this manner.

In the drawings accompanying this specification and forming a part of this application I have shown, for purposes of illustration, one form which my invention may assume, and in these drawings the single figure is a cross section through the embodiment of my invention disclosed herein.

The embodiment of my invention disclosed herein comprises a mold 10 having a pair of mold side plates 11, and a pair of bead rings 12 cooperating with the side plates 11 to complete the mold cavity 13 except for a gap in the base of the cavity 13 between the spaced opposed faces 14 of the bead rings 12.

Disposed within the mold cavity 13 is the tire 15 to be vulcanized, and within this tire 15 is a flexible flap 16 formed of rubberized fabric, or other suitable material, extending below the beads 17 of the tire 15 into position overlapping the faces 14 of the bead rings 12, and provided at its edges with annular ribs 18 seating within annular recesses 19 formed in the faces 14 of the bead rings 12 and effective to accurately position the flap 16 relative to the mold and the tire.

Positioned between the ends of the flap 16 is a resilient bull ring 20 formed of soft rubber of preferably the condition of the usual tire tread, formed at its base with oblique faces 21 cooperating with the corresponding oblique faces 22 of the bead rings 12 to register the bull ring 20 with the mold 10, provided with a projecting portion 23 extending within the tire 15 and having tapered off edges 24 rising along the sides of the flap 16 and terminating somewhat above the beads 17 of the tire 15, and provided with a duct 25 secured in position in the bull ring 20 by means of enlargements 26 and extending through the bull ring 20 to provide for the insertion of fluid into the interior of the flap 16.

The bead rings 12 are recessed at 27 to provide for the passage of the duct 25 therethrough, and are held together by means of a plurality of bolts 28.

It will be understood that in operation the flap 16 is inserted within the tire 15, the bull ring 20 is inserted within the flap 16, the tire 15 and flap 16 and bull ring 20 are mounted between the two bead rings 12, the two beads 12 are secured together by means of the bolts 28, the assembled unit is placed between the mold side plates 11, the mold side plates 11 are secured together in any suitable manner, as by the ram of the usual heater pot, fluid is forced through the duct 25 into the interior of the flap 16 to expand the tire 15 into the mold 11, and the tire is cured while so expanded.

From the above description it will be obvious to those skilled in the art that I have provided new and improved vulcanizing means particularly adapted for curing tires under internal fluid pressure, and accordingly that the embodiment of my invention herein disclosed accomplishes at least the principal object of my invention.

At the same time it also will be obvious to those skilled in the art that the embodiment of my invention herein shown and described may be variously changed and modified without departing from the spirit of my invention or sacrificing the advantages thereof, and it therefore will be understood that the disclosure herein is illustrative only, and that my invention is not limited thereto.

I claim:

1. A tire vulcanizing mold comprising: a pair of mold sides spaced from each other at the base of the tire cavity to provide spaced opposed faces one on one of said sides and the other on the other of said sides, but contoured to define otherwise at least the base portion of said cavity; a flexible flap adapted to be disposed within a tire within said mold with its edges overlapping said faces; and a compressible bull ring interposed between said faces effective to seal said edges tightly to itself.

2. A tire vulcanizing mold comprising: a pair of mold sides spaced from each other at the base of the tire cavity to provide spaced opposed faces one on one of said sides and the other on the other of said sides, but contoured to define otherwise at least the base portion of said cavity; a flexible flap adapted to be disposed within a tire within said mold with its edges overlapping said faces; and a soft-rubber bull ring interposed between said faces effective to seal said edges tightly to itself.

3. A tire vulcanizing mold comprising: a pair of mold sides spaced from each other at the base of the tire cavity to provide spaced opposed faces one on one of said sides and the other on the other of said sides, but contoured to define otherwise at least the base portion of said cavity; a flexible flap adapted to be disposed within a tire within said mold with its edges overlapping said faces; and a bull ring interposed between said faces effective to seal said edges tightly to itself, and provided with annular tapering off extensions extending up the sides of said flap.

4. A tire vulcanizing mold comprising: a pair of mold sides spaced from each other at the base of the tire cavity to provide spaced opposed faces one on one of said sides and the other on the other of said sides, but contoured to define otherwise at least the base portion of said cavity; a flexible flap adapted to be disposed within a tire within said mold with its edges overlapping said faces; and a compressible bull ring interposed between said faces effective to seal said edges tightly to itself, and provided with annular tapering off extensions extending up the sides of said flap.

5. A tire vulcanizing mold comprising: a pair of mold sides spaced from each other at the base of the tire cavity to provide spaced opposed faces one on one of said sides and the other on the other of said sides, but contoured to define otherwise at least the base portion of said cavity; a flexible flap adapted to be disposed within a tire within said mold with its edges overlapping said faces; and a soft-rubber bull ring interposed between said faces effective to seal said edges tightly to itself, and provided with annular tapering off extensions extending up the sides of said flap.

6. A tire vulcanizing mold comprising: a pair of mold sides spaced from each other at the base of the tire cavity to provide spaced opposed faces one on one of said sides and the other on the other of said sides, but contoured to define otherwise at least the base portion of said cavity; a flexible flap adapted to be disposed within a tire within said mold with its edges overlapping said faces; a compressible bull ring interposed between said faces effective to seal said edges tightly to itself; and a duct carried by said bull ring passing through said bull ring to provide means for the insertion of fluid within said flap.

7. A tire vulcanizing mold comprising: a pair of mold sides spaced from each other at the base of the tire cavity to provide spaced opposed faces one on one of said sides and the other on the other of said sides, but contoured to define otherwise at least the base portion of said cavity; a flexible flap adapted to be disposed within a tire within said mold with its edges overlapping said faces; a soft-rubber bull ring interposed between said faces effective to seal said edges tightly to itself; and a duct carried by said bull ring passing through said bull ring to provide means for the insertion of fluid within said flap.

8. A tire vulcanizing mold comprising: a pair of mold sides spaced from each other at the base of the tire cavity to provide spaced opposed faces one on one of said sides and the other on the other of said sides, but contoured to define otherwise at least the base portion of said cavity, and each provided with an annular seat; a flexible flap adapted to be disposed within a tire within said mold with its edges overlapping said faces; and a bull ring interposed between said faces effective to seal said edges tightly to itself, provided with annular tapering off extensions extending up the sides of said flap, and formed to cooperate with said seats to register said bull ring with said sides.

9. A tire vulcanizing mold comprising: a pair of mold sides spaced from each other at the base of the tire cavity to provide spaced opposed faces one on one of said sides and the other on the other of said sides, but contoured to define otherwise at least the base portion of said cavity, and each provided with an annular seat; a flexible flap adapted to be disposed within a tire within said mold with its edges overlapping said faces; a bull ring interposed between said faces effective to seal said edges tightly to itself, provided with annular tapering off extensions extending up the sides of said flap, and formed to cooperate with said seats to register said bull ring with said sides; and a duct carried by said bull ring passing through said bull ring to provide means for the insertion of fluid within said flap.

10. A tire vulcanizing mold comprising: a pair of mold sides spaced from each other at the base of the tire cavity to provide spaced opposed faces one on one of said sides and the other on the other of said sides and each provided with an annular groove, but contoured to define otherwise at least the base portion of said cavity; a flexible flap adapted to be disposed within a tire within said mold with its edges overlapping said faces and provided with annular ribs cooperating with said grooves to position said flap; and a bull ring interposed between said faces effective to seal said edges tightly to itself.

11. A tire vulcanizing mold comprising: a pair of mold side plates forming at least the sides of the mold cavity; a pair of bead rings cooperating with said side plates, spaced from each other at the base of the tire cavity to provide spaced opposed faces one on one of said sides and the other on the other of said sides and each provided with an annular groove, but contoured to define otherwise the base portion of said cavity; a flexible flap adapted to be disposed within a tire within said mold with its edges overlapping said faces, and provided with annular ribs cooperating with said grooves to position said flap; and a bull ring interposed between said faces effective to seal said edges tightly to itself.

12. A tire vulcanizing mold comprising: a pair of mold sides spaced from each other at the base of the tire cavity to provide spaced opposed faces one on one of said sides and the other on the other of said sides and each provided with an annular groove, but contoured to define otherwise at least the base portion of said cavity, and each provided with an annular seat; a flexible flap adapted to be disposed within a tire within said mold with its edges overlapping said faces and provided with annular ribs cooperating with said grooves to position said flap; and a bull ring interposed between said faces effective to seal said edges tightly to itself, and formed to cooperate with said seats to register said bull ring with said sides.

13. A tire vulcanizing mold comprising: a pair of mold side plates forming at least the side of the mold cavity; a pair of bead rings cooperating with said side plates, spaced from each other at the base of the tire cavity to provide spaced opposed faces one on one of said sides and the other on the other of said sides and each provided with an annular groove, and with an annular seat, but contoured to define otherwise the base portion of said cavity; a flexible flap adapted to be disposed within a tire within said mold with its edges overlapping said faces, and provided with annular ribs cooperating with said grooves to position said flap; and a bull ring interposed between said faces effective to seal said edges tightly to itself, and formed to cooperate with said seats to register said bull ring with said bead rings.

In testimony whereof I hereunto affix my signature.

WM. A. BRUBAKER.